(12) United States Patent
Reimer

(10) Patent No.: US 10,219,504 B2
(45) Date of Patent: Mar. 5, 2019

(54) FISHING TACKLE RETRIEVAL DEVICE

(71) Applicant: Bill Reimer, Winnipeg (CA)

(72) Inventor: Bill Reimer, Winnipeg (CA)

(*) Notice: Subject to any disclaimer, the term of this patent is extended or adjusted under 35 U.S.C. 154(b) by 355 days.

(21) Appl. No.: 15/255,239

(22) Filed: Sep. 2, 2016

(65) Prior Publication Data

US 2018/0064087 A1    Mar. 8, 2018

(51) Int. Cl.
*A01K 97/24*    (2006.01)

(52) U.S. Cl.
CPC .................... *A01K 97/24* (2013.01)

(58) Field of Classification Search
CPC ......... A01K 97/24; B63C 11/48; B63C 11/50; B63C 11/52; B66C 13/02; B26B 27/00
See application file for complete search history.

(56) References Cited

U.S. PATENT DOCUMENTS

| | | | |
|---|---|---|---|
| 2,074,057 A | 3/1937 | Kempe | |
| 2,479,448 A * | 8/1949 | Woock | A01K 97/24 43/17.2 |
| 2,488,996 A * | 11/1949 | Duff | A01K 97/24 43/17.2 |
| 2,516,036 A | 7/1950 | Whitlow | |
| 2,634,539 A * | 4/1953 | Brown | A01K 97/24 43/17.2 |
| 2,828,570 A | 4/1958 | Bradbury | |
| 3,016,649 A * | 1/1962 | Ratcliff | A01K 97/24 43/17.2 |
| 3,176,425 A | 4/1965 | Mudd | |
| 3,296,730 A * | 1/1967 | Leverdingen | A01K 97/24 43/17.2 |
| 3,315,399 A * | 4/1967 | Couture | A01K 97/24 43/17.2 |
| 3,336,067 A | 8/1967 | Cloyd | |
| 3,364,611 A * | 1/1968 | Downing | A01K 97/24 43/17.2 |
| 3,464,138 A | 9/1969 | Lindner | |
| 3,550,303 A * | 12/1970 | Delroy | A01K 97/24 294/66.1 |
| 3,861,071 A * | 1/1975 | Nordhagen | A01K 97/24 43/17.2 |
| 3,922,810 A * | 12/1975 | Kelly | A01K 97/24 43/17.2 |
| 4,467,547 A * | 8/1984 | Chabot | A01K 97/24 43/17.2 |

(Continued)

FOREIGN PATENT DOCUMENTS

GB    2329818 A * 4/1999 ............ A01K 97/24

*Primary Examiner* — Kathleen I Alker

(57) ABSTRACT

A fishing tackle retrieval device for freeing snagged fishing tackle includes a ring that is oblong, thus defining a narrow end and a wide end. A bar is coupled to the ring proximate to the wide end. A loop is coupled to the bar distal from the ring and extends curvedly from the bar, defining a free end that is positioned proximate to the bar. The free end and the bar define a slit in the loop. A cut is positioned through the ring proximate to the narrow end. A coupler, configured to couple to a retrieval line, is coupled to and positioned on the wide end. A notch is positioned in the ring at the narrow end. The notch is configured to couple to a fishing line-leader connection as the ring is pulled toward the surface, such that the fishing tackle is disengaged from the obstruction.

11 Claims, 3 Drawing Sheets

(56) References Cited

U.S. PATENT DOCUMENTS

| | | | |
|---|---|---|---|
| 4,536,984 A | 8/1985 | Kowal | |
| 7,451,567 B2 * | 11/2008 | Irvine | A01K 97/24 43/17.2 |
| D598,518 S | 8/2009 | Kennedy | |
| 9,027,275 B2 * | 5/2015 | Eberhart | A01K 97/14 294/19.3 |
| 2009/0169308 A1 * | 7/2009 | Pajas | B63C 11/02 405/185 |

* cited by examiner

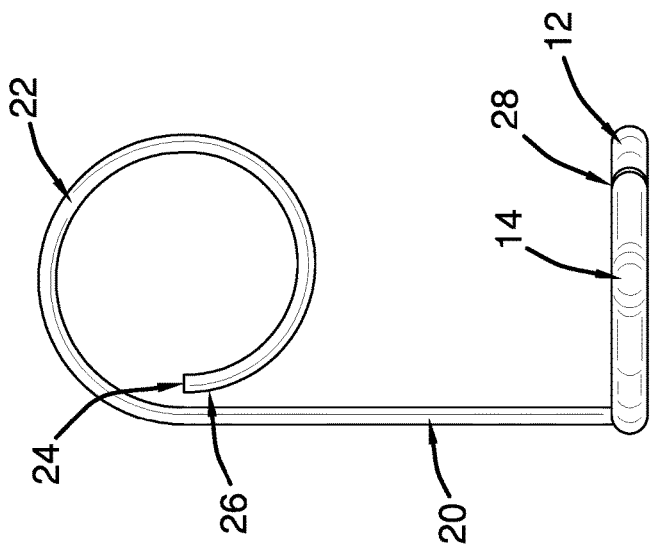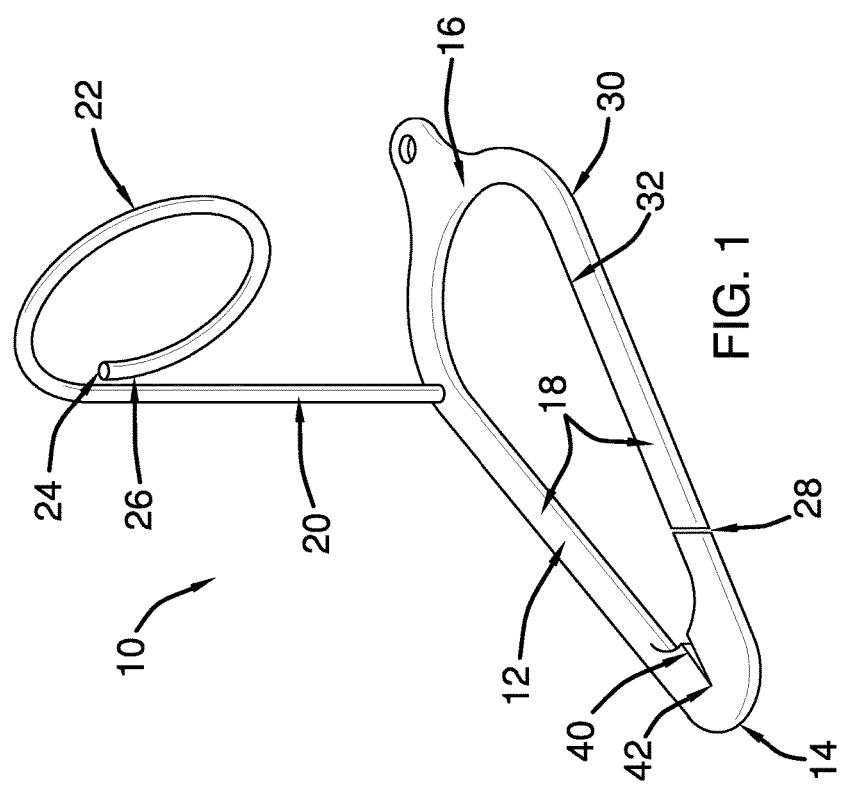

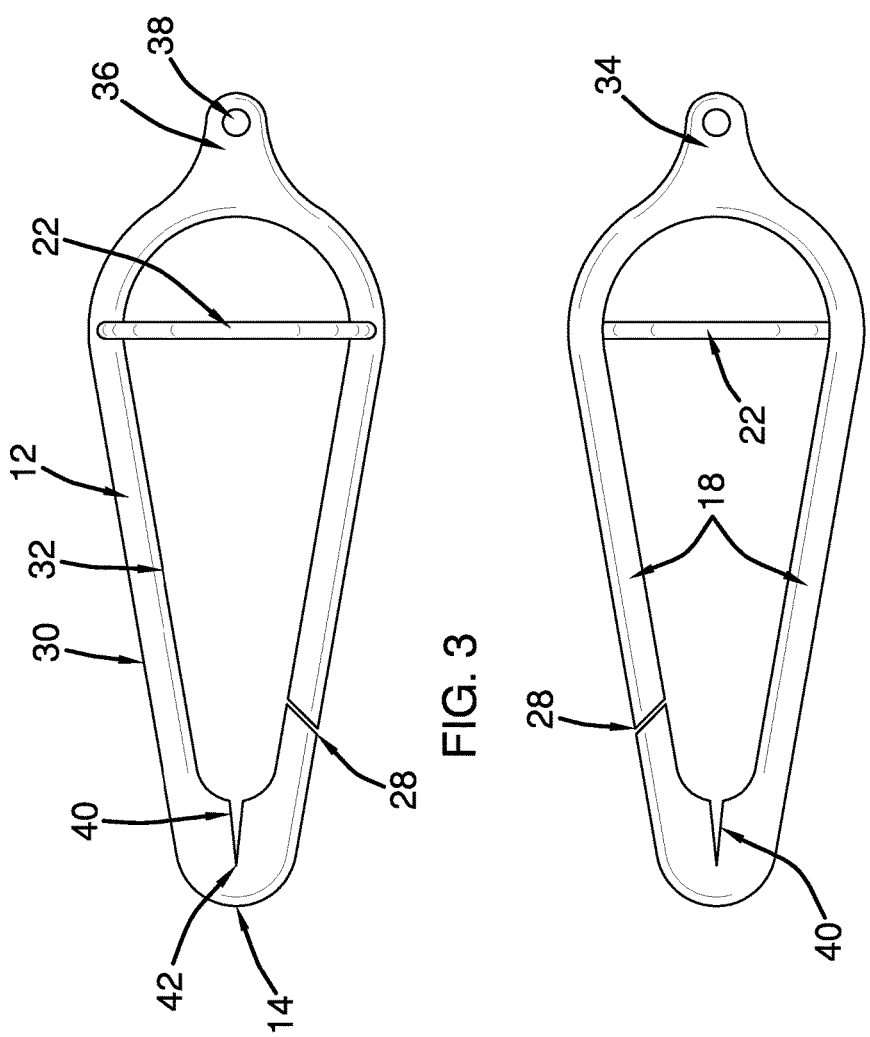

FISHING TACKLE RETRIEVAL DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION (1) Field of the Invention (2) Description of Related Art including information disclosed under 37 CFR 1.97 and 1.98

The disclosure and prior art relates to fishing tackle accessories and more particularly pertains to a new fishing tackle accessory for freeing snagged fishing tackle.

(h) BRIEF SUMMARY OF THE INVENTION

An embodiment of the disclosure meets the needs presented above by generally comprising a ring that is oblong, thus defining a narrow end and a wide end. A bar is coupled to the ring proximate to the wide end. A loop is coupled to the bar distal from the ring and extends curvedly from the bar, defining a free end that is positioned proximate to the bar. The free end and the bar define a slit in the loop. A cut is positioned through the ring proximate to the narrow end. A coupler, configured to couple to a retrieval line, is coupled to and positioned on the wide end. A notch is positioned in the ring at the narrow end. The notch is configured to couple to a fishing line-leader connection as the ring is pulled toward the surface, such that the fishing tackle is disengaged from the obstruction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a fishing tackle retrieval device according to an embodiment of the disclosure.

FIG. 2 is an end view of an embodiment of the disclosure.

FIG. 3 is a top view of an embodiment of the disclosure.

FIG. 4 is a bottom view of an embodiment of the disclosure.

(j) DETAILED DESCRIPTION OF THE INVENTION

Figure 5:
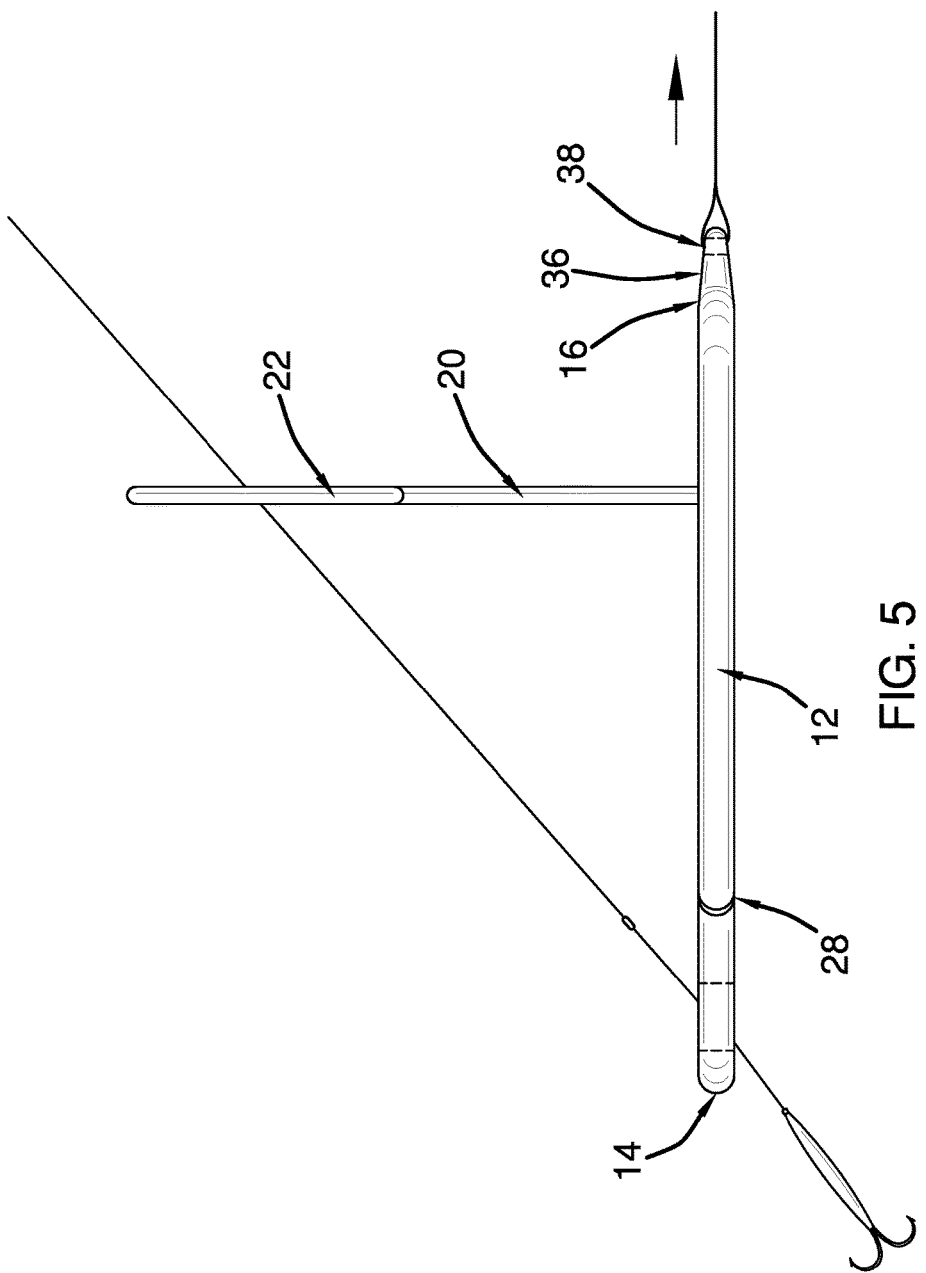
FIG. 5 is a side view of an embodiment of the disclosure.

With reference now to the drawings, and in particular to FIGS. 1 through 5 thereof, a new fishing tackle accessory embodying the principles and concepts of an embodiment of the disclosure and generally designated by the reference numeral 10 will be described.

As best illustrated in FIGS. 1 through 5, the fishing tackle retrieval device 10 generally comprises a ring 12. The ring 12 is oblong, thus defining a narrow end 14 and a wide end 16. The ring 12 comprises opposing sides 18 that extend between the narrow end 14 and the wide end 16. In one embodiment, the opposing sides 18 are linear and nonparallel.

A bar 20 is coupled to the ring 12 proximate to the wide end 16. In one embodiment, the bar 20 is substantially circularly shaped when viewed longitudinally.

A loop 22 is coupled to the bar 20 distal from the ring 12. The loop 22 extends curvedly from the bar 20 and has a free end 24. The free end 24 is positioned proximate to the bar 20, such that the free end 24 and the bar 20 define a slit 26 in the loop 22. The slit 26 is positioned in the loop 22 and is configured to insert, through the slit 26 and into the loop 22, a fishing line that is coupled to a leader. The leader is attached to fishing tackle that is snagged on an obstruction, such as weeds, trees and rocks. In one embodiment, the loop 22 is substantially circularly shaped.

A cut 28 is positioned through the ring 12 proximate to the narrow end 14. The cut 28 is positioned in the ring 12 and is configured to insert, through the cut 28 into the ring 12, the fishing line. The cut 28 extends transversely from an outer perimeter 30 to an inner perimeter 32 of the ring 12.

A coupler 34 is coupled to and positioned on the wide end 16 of the ring 12. The coupler 34 is configured to couple to a retrieval line. In one embodiment, the coupler 34 comprises a tab 36 and a hole 38. The tab 36 is coupled to the ring 12 and the hole is positioned through the tab 36. The hole 38 is positioned through the tab 36 and is configured to insert an end of the retrieval line, such that the ring 12 is knottedly couplable to the retrieval line.

In one embodiment, the ring 12, the bar 20, the loop 22 and the coupler 34 comprise metal. In another embodiment, the ring 12, the bar 20, the loop 22 and the coupler 34 comprise steel.

A notch 40 is positioned in the ring 12 at the narrow end 14. The notch 40 extends from the inner perimeter 32 of the ring 12 toward the outer perimeter 30 of the ring 12. The notch 40 is positioned in the ring 12 such that the notch 40 is configured to pass over a fishing line-leader connection, such as a knot, when sinking. The notch 40 is configured to couple to the fishing line-leader connection as the ring 12 is pulled toward the surface by the retrieval line. In one embodiment, the notch 40 is V-shaped and defines a point 42 of the notch 40. In another embodiment, the point 42 is positioned substantially equally distant from the inner perimeter 32 and the outer perimeter 30.

In use, the slit 26 is positioned in the loop 22, and the cut 28 is positioned in the ring 12, such that the slit 26 and the cut 28 are configured to insert into the loop 22 and the ring 12, respectively, a fishing line that is coupled to a leader. The leader is attached to fishing tackle that is snagged on an obstruction, such as weeds, trees and rocks The coupler 34 is configured to couple to a retrieval line, such that the retrieval line, the loop 22 and the ring 12 descend along the fishing line. The notch 40 is configured to pass over a fishing line-leader connection, such as a knot, when sinking. The notch 40 also is configured to couple to the fishing line-leader connection as the ring 12 is pulled toward the surface by a user positioned to exert a pulling force on the retrieval line. The pulling force is transferred to the ring 12 and to the leader, such that the fishing tackle is disengaged from the obstruction.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing tackle retrieval device comprising:
    a ring, said ring being oblong defining a narrow end and a wide end;
    a bar coupled to said ring proximate to said wide end;
    a loop coupled to said bar distal from said ring, said loop extending curvedly from said bar, said loop defining a free end, said free end being positioned proximate to said bar, such that said free end and said bar define a slit in said loop;
    a cut positioned through said ring proximate to said narrow end;
    a coupler coupled to and positioned on said wide end of said ring, said coupler being configured to couple to a retrieval line;
    a notch positioned in said ring at said narrow end, said notch extending from an inner perimeter of said ring toward an outer perimeter of said ring; and
    wherein said slit is positioned in said loop, and said cut is positioned in said ring, such that said slit and said cut are configured to receive a fishing line that is then inserted into said loop and said ring, respectively, the fishing line being coupled to a leader to which is attached fishing tackle that is snagged on an obstruction, wherein said coupler is configured to couple to a retrieval line, such that the retrieval line, said loop and said ring descend along the fishing line, wherein said notch is configured to pass over a fishing line-leader connection when sinking and to couple to the fishing line-leader connection as said ring is pulled toward a surface by a user positioned to exert a pulling force on the retrieval line that is transferred to said ring and to the leader, such that the fishing tackle is disengaged from the obstruction.

2. The device of claim 1, further including said ring comprising opposing sides extending between said narrow end and said wide end, said opposing sides being linear and nonparallel.

3. The device of claim 1, further including said bar being substantially circularly shaped when viewed longitudinally.

4. The device of claim 1, further including said loop being substantially circularly shaped.

5. The device of claim 1, further including said cut extending transversely from said outer perimeter to said inner perimeter of said ring.

6. The device of claim 1, further including said coupler comprising: a tab coupled to said ring; a hole positioned through said tab; and wherein said hole is positioned through said tab such that said hole is configured to receive an end of the retrieval line, such that said retrieval line is knottedly couplable to the ring.

7. The device of claim 1, wherein said ring, said bar, said loop and said coupler comprising metal.

8. The device of claim 7, wherein said ring, said bar, said loop and said coupler comprising steel.

9. The device of claim 1, further including said notch being V-shaped defining a point of said notch.

10. The device of claim 9, further including said point being positioned substantially equally distant from said inner perimeter and said outer perimeter.

11. A fishing tackle retrieval device comprising:
    a ring, said ring being oblong defining a narrow end and a wide end, said ring comprising opposing sides extending between said narrow end and said wide end, said opposing sides being linear and nonparallel;
    a bar coupled to said ring proximate to said wide end, said bar being substantially circularly shaped when viewed longitudinally;
    a loop coupled to said bar distal from said ring, said loop extending curvedly from said bar, said loop defining a free end, said free end being positioned proximate to said bar, such that said free end and said bar define a slit in said loop, wherein said slit is positioned in said loop such that said slit is configured to receive a fishing line that is then inserted into said loop, the fishing line being coupled to a leader to which is attached fishing tackle that is snagged on an obstruction, said loop being substantially circularly shaped;
    a cut positioned through said ring proximate to said narrow end, wherein said cut is positioned in said ring such that said cut is configured to receive the fishing line that is then inserted into said ring, said cut extending transversely from an outer perimeter to an inner perimeter of said ring;
    a coupler coupled to and positioned on said wide end of said ring, said coupler being configured to couple to a retrieval line, such that the retrieval line, said loop and said ring descend along the fishing line, said coupler comprising:

a tab coupled to said ring, a hole positioned through said tab, and wherein said hole is positioned through said tab such that said hole is configured to receive an end of the retrieval line, such that said retrieval line is knottedly couplable to the ring;

said ring, said bar, said loop and said coupler comprising steel;

a notch positioned in said ring at said narrow end, said notch extending from said inner perimeter of said ring toward said outer perimeter of said ring, wherein said notch is positioned in said ring such that said notch is configured to pass over a fishing line-leader connection when sinking and to couple to the fishing line-leader connection as said ring is pulled toward a surface by a user positioned to exert a pulling force on the retrieval line that is transferred to said ring and to the leader, such that the fishing tackle is disengaged from the obstruction, said notch being V-shaped defining a point of said notch, said point being positioned substantially equally distant from said inner perimeter and said outer perimeter.

\* \* \* \* \*